April 5, 1966 W. W. CEASE 3,244,537
METHOD FOR PREPARING AND SERVING COMBINATIONS OF FOOD ITEMS
Filed March 25, 1963
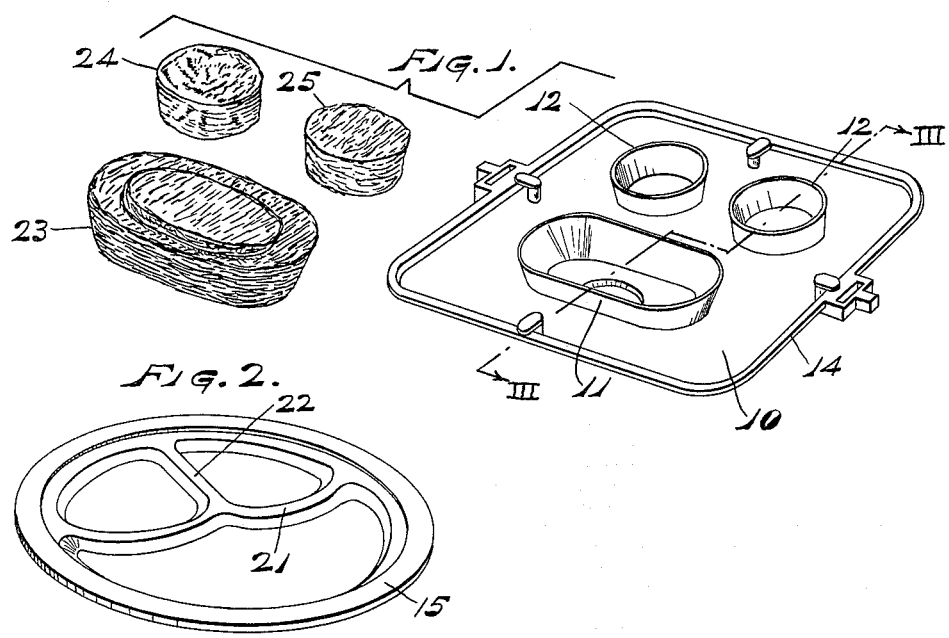
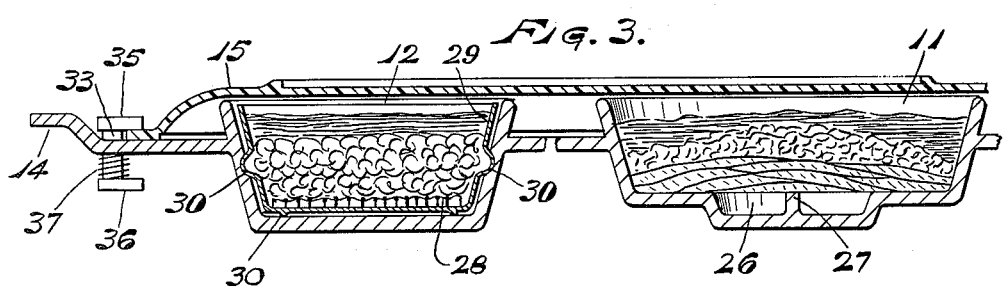
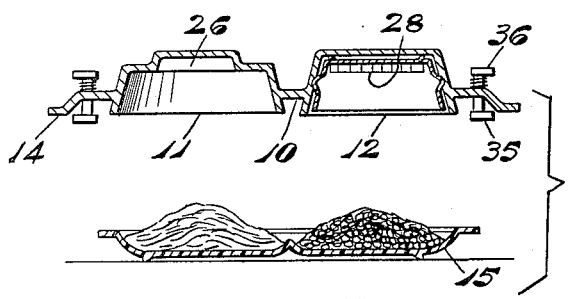
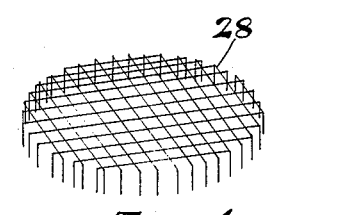
INVENTOR.
William W. Cease
BY
Christel + Bean
ATTORNEYS.

United States Patent Office 3,244,537
Patented Apr. 5, 1966

3,244,537
METHOD FOR PREPARING AND SERVING
COMBINATIONS OF FOOD ITEMS
William W. Cease, Fredonia, N.Y., assignor to
Cease Central, Inc., Dunkirk, N.Y.
Filed Mar. 25, 1963, Ser. No. 267,746
4 Claims. (Cl. 99—192)

This invention relates to food service packages and particularly to packages or devices which are adapted for use in heating or cooking foods, frozen or otherwise, and dispensing the same on a service plate which serves as a cover for the package preliminary to the serving of the food.

My prior copending patent application, Serial No. 220,517, filed August 30, 1962, discloses the general idea of a food preparation and service package which comprises a holder or container for foods comprising one or more food receptacles with a cover member which comprises an inverted service plate or dish. The food is heated, or cooked if cooking is required, in this covered package and is served by inverting the package, removing the holder or container which is now uppermost, and serving the food in the service plate or dish.

The present invention relates to certain phases of this general arrangement and to certain improvements therein. While not necessarily thus limited, the packages of the present invention are highly adaptable to and usable in the domestic preparation and service of frozen or other previously prepared or partially prepared foods.

Further, while a single article or body, or kind of food may be prepared and dispensed in accordance herewith, the principles and techniques of the present invention are particularly advantageous in preparing and simultaneously heating and serving combinations of foods, as for instance, a complete dinner comprising an entree, potatoes and other vegetable, or two vegetables.

A further advantage of the principles and apparatus of the present invention over previously prepared dinners or complete meals of the practical prior art resides in the fact that the present invention provides means whereby several variable selected food items may readily be combined in the holder and prepared and served in accordance herewith with particular attention to the varying cooking or heating requirements of the several items.

More particularly, the present invention contemplates a complete meal service method which may be used in any environment but which is highly advantageous in domestic use or relatively small scale commercial operations. According to this phase of the present invention individual portions of prepared foods are frozen in blocks of predetermined form to fit receptacles or recesses in a food holder.

The holders provided in furtherance of the present method generally comprise a metal body member having a number of containers or recesses for receiving, for instance, an entree and two vegetables, all in individual recesses. An inverted plate of ovenware or other ceramic or heat resistant material is placed over the holder after the frozen food blocks have been selected and inserted in the recesses and serves as a cover during heating in an oven, steam chamber or other heating device.

As will appear more fully later herein, special provisions are made for layering or stratifying the different food components of a given portion or serving and for regulating the degree of heating of different items of a combination of food portions.

In the form illustrated herein the apparatus includes readily engageable and releasable means for securing the holder element and the service plate element to each other during heating and handling of the package until the same has been inverted and is ready to be served, whereupon the securing means is readily released.

Exemplary embodiments of the principles of the present invention are illustrated in the accompanying drawing and described in the following specification. However, it is to be understood that specific references therein are for the purpose of illustrating the principles of the present invention and that numerous variations and modifications may be employed without departing from the invention, the scope of which is limited only as defined in the appended claims.

In the drawing:

FIG. 1 is a disassembled perspective view of one form of the holder of the present invention with several frozen food blocks adapted to be inserted therein;

FIG. 2 is a perspective view of a serving plate adapted to be employed with the holder of FIG. 1;

FIG. 3 is a cross-sectional view through the holder of FIG. 1 taken approximately on the line III—III of FIG. 1 and showing the serving plate of FIG. 2 assembled therewith;

FIG. 4 is a detailed perspective view of a supporting screen element of the structure shown in FIG. 3; and FIG. 5 is a cross-sectional view showing the holder and service plate of FIGS. 1 and 2 after heating, inversion and separation of the plate and holder.

Like characters of reference denote like parts throughout the several figures of the drawings and referring particularly to FIG. 1, the numeral 10 designates generally a holder which in the present instance is cast aluminum but may be of other suitable material. Holder 10 has formed integrally therewith a plurality of food receiving receptacles, in the present instance an oval or oblong entree receptacle 11 and two round receptacles 12 for vegetables or other side dishes.

If desired, the receptacles 11 may be rectangular and the receptacles 12 may be square. Various other shapes and configurations of the receptacles may be employed. As illustrated in FIG. 3, the receptacles 11 and 12 project upwardly beyond the general body portion of holder 10. As best shown in FIG. 3, the holder 10 is provided with an upwardly offset marginal flange 14.

A service plate 15 illustrated in FIG. 2 is proportioned to fit against the body portion of holder 10 with the plate inverted and with its marginal flange fitting well within the offset which forms the marginal flange 14 of the holder. The service plate 15 will tend to locate itself properly on the holder 10, the locating action occurring between the upper edges of the containers 11 and 12 and the angles on the plate at the juncture of the bottom wall thereof with the sloping side wall, as likewise appears in FIG. 3.

Ribs 21 and 22 on plate 15 divide the same into compartments which generally register with the tops of the receptacles 11 and 12. In the modification mentioned above wherein the receptacles 11 and 12 are rectangular and square, respectively, a square service plate may be employed to advantage.

In FIG. 1 the numerals 23, 24 and 25 designate frozen blocks of food, each comprising an individual portion of prepared food. In general the food comprising the blocks 23, 24 and 25 consist of food articles which are substantially completely cooked and seasoned before freezing, as distinguished from conventional frozen vegetables, for instance, which are merely blanched prior to freezing and require substantial cooking after thawing.

The frozen blocks may consist of any of a wide variety of prepared foods. Merely by way of example, an entree block 23 may consist of sliced turkey, dressing and gravy. In this case the portion would preferably be frozen in stratified form with the gravy at the bottom of the block (with respect to the position in which it is inserted in receptacle 11), the turkey next, and the dressing on top. Accordingly, when the package is inverted and the holder lifted off, the dressing will be at the bottom with the sliced turkey, on the dressing and the gravy will be deposited on top of the turkey by inversion of the package.

If the gravy is not thus stratified during freezing, and also in the case of buttered vegetables and the like, the liquid components will tend to settle to the bottom during thawing and will then be "poured" over the food upon inversion. To assist in this segregation of the liquid or semiliquid constituents during heating the receptacle 11 is shown herein as having a central gravy well 26 which may include one or more ribs 27 for supporting the solid food constituents above the gravy well.

For providing a similar well for juices, butter or other dressing for vegetables or other foods, an inverted cup-shaped screen member 28 may be pressed into one or both of the receptacles 12.

In certain cases one of the foods of the combination may heat more readily or may require less heating. To control the relative degree of heating of metal cup or dish 29 may be inserted in a receptacle 12 as shown in FIG. 3. Protuberances 30 on the side and bottom walls of cup or dish 29 space the same from the receptacle wall to provide an insulating air space which retards heating of the food in cup or dish 29. The protuberances 30 at the sides of the cup or dish 29 may seat releasably in dimples or depressions in the receptacle wall for yieldably retaining the cup or dish against inadvertent displacement, particularly when the holder is inverted.

Reference will now be had to means which are provided for securely retaining the plate in assembled relation with the holder when desired. Referring to FIG. 3, the numeral 33 designates a stem or shaft member which is slidably and rotatably disposed in an aperture formed therefor in holder 10. In the illustrated instance four stems 33 are provided but a lesser number may suffice. Each stem 33 has head formations 35 and 36 at its upper and lower ends with a compression coil spring 37 between holder 10 and the lower head 36 for urging the stem in a downward direction.

The heads 35 and 36 are eccentric or noncircular and in the case of head 35 the projecting portion thus formed operates to selectively secure the marginal flange of plate 15 against holder 10.

By grasping head 35 and rotating stem 33 from the position shown in FIG. 3 the projecting portion of head 35 cams on the offset surface of holder 10 to raise head 35 and its projecting portion, then rests on flange 14 of holder 10 in inoperative position. When a plate 15 is placed upon holder 10 head 35 is manually rotated 180° which releases the same from flange 14 and moves the projecting portion thereof to the flange of plate 15 as shown in FIG. 3, whereby the plate 15 is resiliently held against holder 10. The lower head 36 is preferably also noncircular to facilitate grasping the same for manual rotation to release a holder when the package is in the inverted position shown in FIG. 5.

The entire package is then placed in a conventional oven and heated. If desired the heating may be in a pressure steamer or other form of heating apparatus. After heating the package is inverted whereby the liquid or semiliquid components are deposited on top of the food as described above, the holder 10 is released and raised as shown in FIG. 5, and the service plate 15 is ready for serving.

I claim:

1. A method of preparing and serving combinations of food items on a service plate which comprises separately freezing a variety of prepared food items in predetermined block form, depositing selected items from such variety of frozen block forms in recesses in a holder to form various desired combinations of food items, said recesses having shapes generally complemental to said frozen block forms, applying an inverted service plate over said holder to serve as a cover therefor, heating the assembly thus produced to thaw the foods and prepare the same for consumption, inverting said assembly to deposit the heated foods upon said service plate, and lifting said holder from said service plate whereby the latter is ready for service to a consumer.

2. A method of preparing and serving combinations of food items on a service plate which comprises separately freezing a variety of prepared food items in predetermined block form with the more liquid components of some of said items stratified with respect to the more solid components, depositing selected items from such variety of frozen block forms in recesses in a holder to form a desired combination of food items with said stratified more liquid components lowermost, said recesses having shapes generally complemental to said frozen block forms, applying an inverted service plate over said holder to serve as a cover therefor, heating the assembly thus produced to thaw the foods and prepare the same for consumption, inverting said assembly to deposit the heated foods upon said service plate and lifting said holder from said service plate whereby the food has a hand served appearance.

3. A method of preparing and serving combinations of food items on a service plate which comprises separately freezing a variety of prepared food items in predetermined block form, depositing selected items from such variety of frozen block forms in recesses in a holder to form various desired combinations of food items, said recesses having shapes generally complemental to said frozen block forms, securing an inverted service plate over said holder to serve as a cover therefor, heating the assembly thus produced to thaw the foods and prepare the same for consumption, inverting said assembly to deposit the heated foods upon said service plate, and detaching and lifting said holder from said service plate whereby the latter is ready for service to a consumer.

4. A method of preparing and serving combinations of food items on a service plate which comprises separately freezing a variety of prepared food items in predetermined block form with the more liquid components of some of said items stratified with respect to the more solid components, depositing selected items from such variety of frozen block forms in recesses in a holder to form a desired combination of food items with said stratified more liquid components lowermost, said recesses having shapes generally complemental to said frozen block forms, securing an inverted service plate over said holder to serve as a cover therefor, heating the assembly thus produced to thaw the foods and prepare the same for consumption, inverting said assembly to deposit the heated foods upon said service plate, and detaching and lifting said holder from said service plate whereby the latter is ready for service to a consumer.

References Cited by the Examiner

UNITED STATES PATENTS

| 1,336,776 | 4/1920 | Drinkwater | 206—4 |
|---|---|---|---|
| 2,096,825 | 10/1937 | Roman | 99—171 |
| 2,211,816 | 7/1940 | Heise | 99—171 |
| 2,641,912 | 6/1953 | Lawler | 220—23.8 |
| 3,016,129 | 1/1962 | King | 220—16 X |

FOREIGN PATENTS 273,762  2/1928  Great Britain.

A. LOUIS MONACELL, *Primary Examiner.*

RAYMOND N. JONES, *Examiner.*